(12) United States Patent
Zhang et al.

(10) Patent No.: US 9,467,384 B2
(45) Date of Patent: Oct. 11, 2016

(54) PACKET FORWARDING APPARATUS AND METHOD USING FLOW SUBGROUP BASED PATH SELECTION FOR DYNAMIC LOAD BALANCING

(71) Applicant: MediaTek Singapore Pte. Ltd., Singapore (SG)

(72) Inventors: Ming Zhang, San Jose, CA (US); Jonathan Chang, Cupertino, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 279 days.

(21) Appl. No.: 14/488,307

(22) Filed: Sep. 17, 2014

(65) Prior Publication Data

US 2015/0163146 A1   Jun. 11, 2015

Related U.S. Application Data

(60) Provisional application No. 61/912,020, filed on Dec. 5, 2013.

(51) Int. Cl.
*H04L 12/803* (2013.01)
*H04L 12/729* (2013.01)
*H04L 12/721* (2013.01)

(52) U.S. Cl.
CPC ........... *H04L 47/125* (2013.01); *H04L 45/125* (2013.01); *H04L 45/38* (2013.01)

(58) Field of Classification Search
None
See application file for complete search history.

(56) References Cited

U.S. PATENT DOCUMENTS

| | | | | |
|---|---|---|---|---|
| 7,613,110 B1* | 11/2009 | Blair | ..................... | H04L 45/245 370/230 |
| 2005/0080923 A1* | 4/2005 | Elzur | ..................... | H04L 47/10 709/238 |
| 2015/0107712 A1* | 4/2015 | Kobayashi | .......... | F15B 13/0842 137/884 |
| 2015/0188823 A1* | 7/2015 | Williams | .............. | H04L 47/125 370/235 |
| 2016/0094463 A1* | 3/2016 | Nguyen | ................ | H04L 45/306 370/235 |

* cited by examiner

*Primary Examiner* — Chirag Shah
*Assistant Examiner* — Amar Persaud
(74) *Attorney, Agent, or Firm* — Winston Hsu; Scott Margo

(57) ABSTRACT

A packet forwarding apparatus has a path selection device used to generate a path selection signal for selecting a destination path from egress paths of an egress path group. The path selection device has a flow group based path selection circuit and a flow subgroup based path selection circuit. The flow group based path selection circuit sets the path selection signal based on a flow group into which a packet is categorized when a dynamic load balancing function is not applied to forwarding of the packet. The flow subgroup based path selection circuit sets the path selection signal based on a flow subgroup into which the packet is categorized when the dynamic load balancing function is applied to forwarding of the packet. Flows associated with the egress path group are categorized into flow subgroups, the flow subgroups are categorized into flow groups, and each flow includes packets with same tuplew(s).

18 Claims, 6 Drawing Sheets

PACKET FORWARDING APPARATUS AND METHOD USING FLOW SUBGROUP BASED PATH SELECTION FOR DYNAMIC LOAD BALANCING

CROSS REFERENCE TO RELATED APPLICATIONS

This application claims the benefit of U.S. provisional application No. 61/912,020, filed on Dec. 5, 2013 and incorporated herein by reference.

BACKGROUND

The disclosed embodiments of the present invention relate to forwarding packets, and more particularly, to a packet processing apparatus and method using the flow subgroup based path selection for dynamic load balancing.

Routing is the process of selecting the best path from a source node to a destination node in a network environment. For example, the current Internet infrastructure consists of interconnected networks. A router, also known as a gateway, is a device that connects different networks together. The router's main tasks may include discovering paths to various destinations and forwarding packets inside the network or between different networks. When a router receives a packet at one of its incoming (ingress) ports, the header of the received packet is checked. When the destination address of the packet is known, the forwarding table lookup is performed to obtain the information to which outgoing (egress) port the packet should be sent.

The router may employ one routing protocol for packet forwarding. For example, ECMP (Equal Cost Multi-Path) is a technique for routing packets along multiple paths of equal cost. When forwarding a packet, the router must decide which next-hop (path) to use. One typical method for determining which next-hop (path) to use when routing with ECMP may employ the hash-based path selection. For example, the router first determines a hash value by performing a hash function upon the packet header fields that identify a flow. Multiple next-hops have been assigned unique hash values. Hence, the router uses the hash value derived from the packet to be forwarded to decide which next-hop (path) to use.

The hash-based path selection distributes flows to ECMP paths statistically. As a result, the hash-based path selection cannot guarantee a uniform bandwidth distribution over the ECMP paths. For example, one equal-cost egress path may be selected to deliver more flows, while another equal-cost egress path may be selected to deliver fewer flows. Further, the packet traffic in each flow may not be equal. Thus, there is a need for an innovative packet forwarding scheme which can applying dynamic load balancing to packet traffic over multiple egress paths to thereby achieve a more uniform bandwidth distribution.

SUMMARY

In accordance with exemplary embodiments of the present invention, a packet processing apparatus and method using the flow subgroup based path selection for dynamic load balancing are proposed to solve the above-mentioned problem.

According to a first aspect of the present invention, an exemplary packet forwarding apparatus is disclosed. The exemplary packet forwarding apparatus includes a path selection device configured to generate a path selection signal referenced for selecting a destination path from a plurality of egress paths belonging to an egress path group. The path selection device includes a flow group based path selection circuit and a flow subgroup based path selection circuit. The flow group based path selection circuit is configured to set the path selection signal based on a flow group into which a packet to be forwarded is categorized when a dynamic load balancing function is not applied to forwarding of the packet. The flow subgroup based path selection circuit is configured to set the path selection signal based on a flow subgroup into which the packet to be forwarded is categorized when the dynamic load balancing function is applied to forwarding of the packet. Flows associated with the egress path group are categorized into a plurality of flow subgroups, the flow subgroups are categorized into a plurality of flow groups, and each of the flows includes a group of packets with same tuple(s).

According to a second aspect of the present invention, an exemplary packet forwarding method is disclosed. The exemplary packet forwarding method include: generating a path selection signal referenced for selecting a destination path from a plurality of egress paths belonging to an egress path group, wherein the generating a path selection signal comprises: when a dynamic load balancing function is not applied to forwarding of a packet, performing a flow group based path selection to set the path selection signal based on a flow group into which the packet to be forwarded is categorized; and when the dynamic load balancing function is applied to forwarding of the packet, performing a flow subgroup based path selection to set the path selection signal based on a flow subgroup into which the packet to be forwarded is categorized. Flows associated with the egress path group are categorized into a plurality of flow subgroups, the flow subgroups are categorized into a plurality of flow groups, and each of the flows includes a group of packets with same tuple(s).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One concept of the present invention is to use a flow subgroup based path selection for dynamic load balancing (DLB). The path selection (i.e., next-hop selection) can be adjusted for flow subgroups, thus increasing the granularity of adjusting packet traffic over multiple egress paths. Further, since the adjustment made to the path selection to re-balance the packet traffic affects the forwarding of packets categorized into a flow subgroup rather than the forwarding of packets categorized into a flow group, the packet traffic adjustment is infrequent. Hence, the packet out-of-order can be handled by existing protocol stack, such as re-ordering or re-transmission in the TCP (Transmission Control Protocol) layer. Further details of the proposed dynamic load balancing design are described as below.

Figure 1:
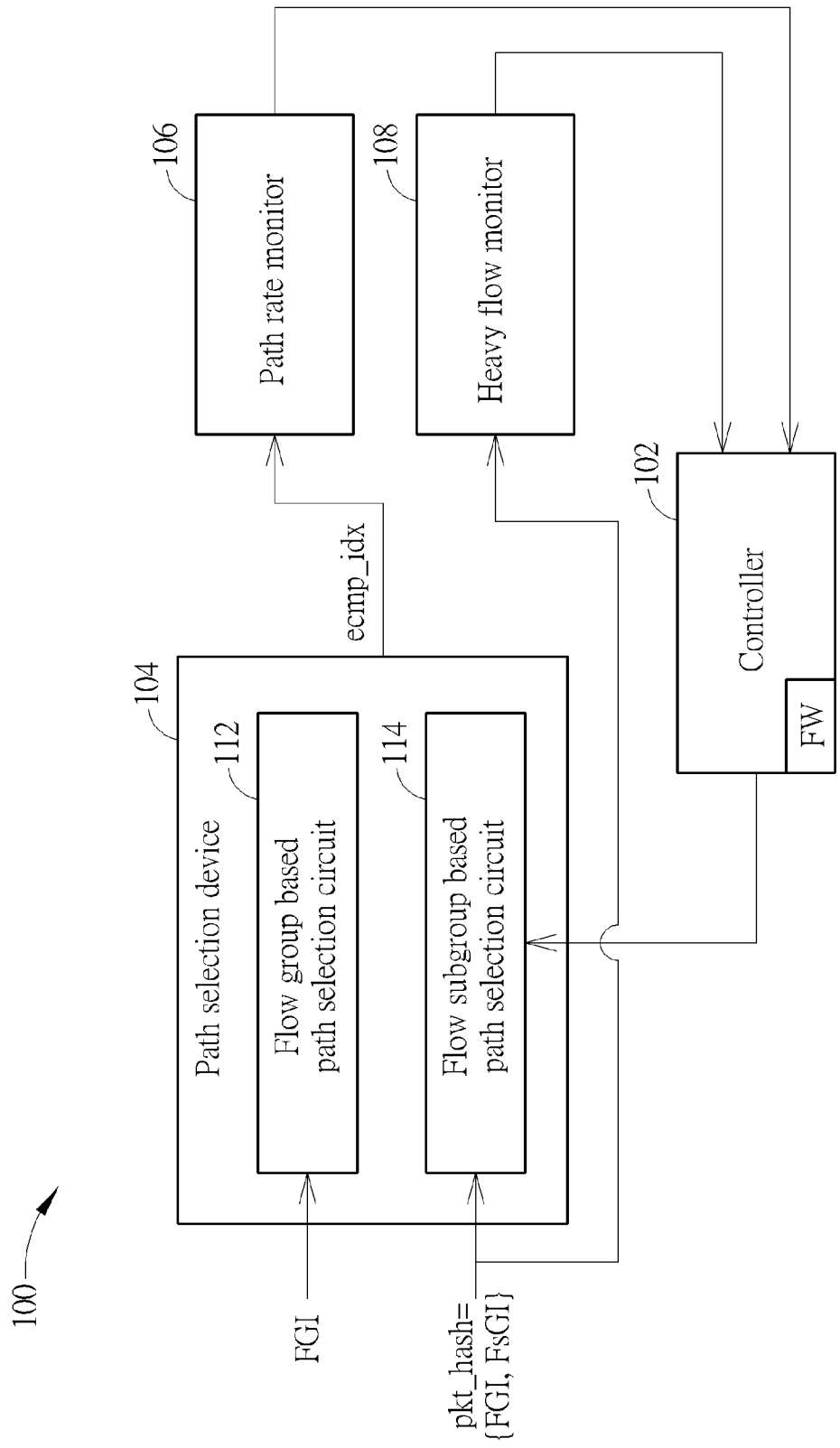
FIG. 1 is a block diagram illustrating a generalized packet forwarding apparatus according to an embodiment of the present invention.

FIG. 1 is a block diagram illustrating a generalized packet forwarding apparatus according to an embodiment of the present invention. By way of example, the packet forwarding apparatus 100 may be part of a network device such as a router or a switch. As shown in FIG. 1, the packet forwarding apparatus 100 includes a controller 102, a path selection device 104, a path rate monitor 106, and a heavy flow monitor 108. It should be noted that only the components pertinent to the path selection function are shown in FIG. 1. In practice, the packet forwarding apparatus 100 may include additional components to provide other functions.

The controller 102 is configured to control at least the packet selection function of the packet forwarding apparatus 100. In one exemplary design, the controller 102 may be implemented using a processor which executes software (e.g., firmware FW of the packet forwarding apparatus 100) to control the path selection function (which includes at least the proposed dynamic load balancing function). For example, the controller 102 controls configurations of path selection device 104, path rate monitor 106 and heavy flow monitor 108.

The path selection device 104 is configured to generate a path selection signal ecmp_idx referenced for selecting a destination path from a plurality of egress paths belonging to the same egress path group. The proposed dynamic load balancing may be employed by a router using an Equal Cost Multi-Path (ECMP) routing technique. Hence, the egress path group mentioned hereafter is an ECMP path group. Alternatively, the proposed dynamic load balancing may be employed by a router using a link aggregation technique. Multiple physical links between two nodes (e.g., routers) may be regarded as a single logical link between the two nodes (e.g., routers). Like ECMP, the link aggregation splits traffic between multiple paths (i.e., links) belonging to the same egress group. Hence, the egress path group mentioned hereafter may be a link aggregation group (LAG) for unicast forwarding.

In this embodiment, the path selection device 104 includes a flow group based path selection circuit 112 and a flow subgroup based path selection circuit 114. For example, the flow group based path selection circuit 112 is responsible for dealing with the hash-based path selection, and the flow subgroup based path selection circuit 114 is responsible for dealing with the dynamic load balancing. Hence, when a dynamic load balancing function is not applied to forwarding of a packet, the flow group based path selection circuit 112 sets the path selection signal ecmp_idx based on a flow group into which the packet to be forwarded is categorized; and when the dynamic load balancing function is applied to forwarding of a packet, the flow subgroup based path selection circuit 114 sets the path selection signal ecmp_idx based on a flow subgroup into which the packet to be forwarded is categorized.

Figure 2:
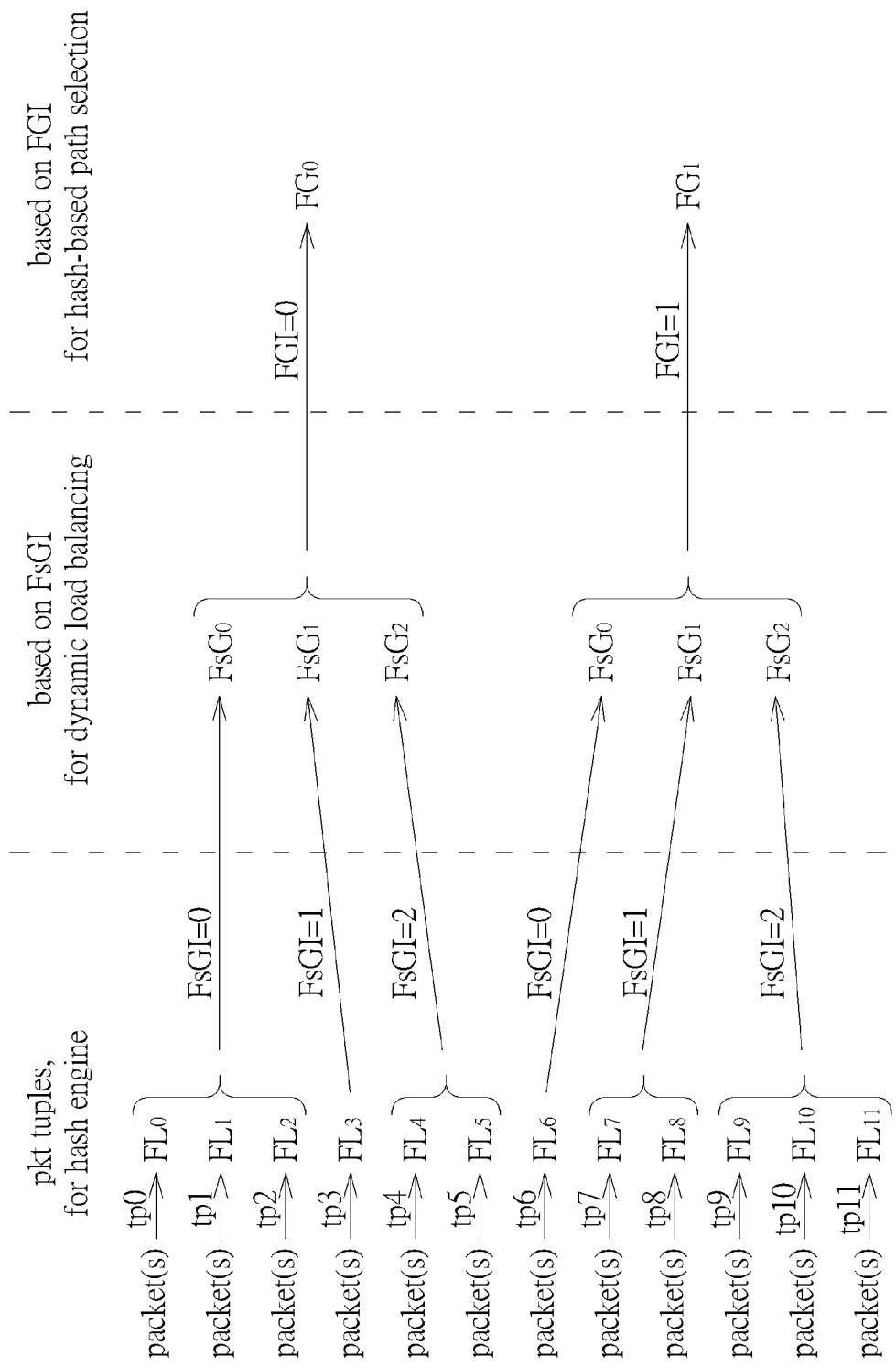
FIG. 2 is a diagram illustrating a flow group hierarchy according to an embodiment of the present invention.

FIG. 2 is a diagram illustrating a flow group hierarchy according to an embodiment of the present invention. Each packet has packet header fields used for identify a flow. Specifically, the flow is a group of packets with the same tuple(s). For example, packets may be categorized into different flows using 5-tuple hash distribution, where a 5-tuple extracted from each packet includes a source IP (internet protocol) address, a source port number, a destination IP address, a destination port number, and a protocol in use. As shown in FIG. 2, packets are categorized into a plurality of flows $FL_0$-$FL_{11}$ according to certain tuples tp0-tp11 extracted from packet headers of the packets received by the router. For example, the flow $FL_0$ is composed of packets with the same tuples tp0, and the flow $FL_1$ is composed of packets with the same tuple (s) tp1, where tp0≠tp1. The tuples tp0-tp11 are further used to categorize flows $FL_0$-$FL_{11}$ into flow subgroups of different flow groups.

In an exemplary design, a hash engine with a predetermined hash algorithm is used to generate a hash result (e.g., a 16-bit hash value) pkt_hash according to a selected set of tuples of each packet. Hence, packets belonging to the same flow should have the same hash result pkt_hash due to the same tuples. For example, a more significant bit (MSB) part of the hash result pkt_hash of a packet is used to serve as a flow group index FGI of a flow group into which the packet is categorized, and the rest of the hash result pkt_hash (i.e., a less significant bit (LSB) part) is used to serve as a flow subgroup index FsGI of a flow subgroup into which the packet is categorized. Since packets belonging to different flow groups may have the same flow subgroup index FsGI, the flow group indices FGI possessed by the packets are needed to distinguish between flow subgroups with the same flow subgroup index FsGI. In other words, hash results pkt_hash, each including a flow group index FGI and a flow subgroup index FsGI (e.g., pkt_hash={FGI, FsGI}), are used to distinguish between different flow subgroups belonging to different flow groups. However, using the flow group indices FGI is enough to distinguish between different flow groups.

As shown in FIG. 2, the flows $FL_0$-$FL_2$ are categorized into the flow subgroup $FsG_0$ of the flow group $FG_0$ due to the fact that the flows $FL_0$-$FL_2$ have the same hash result pkt_hash={0, 0}; the flow $FL_3$ is categorized into the flow subgroup $FsG_1$ of the flow group $FG_0$ due to the fact that the flow $FL_3$ has the hash result pkt_hash={0, 1}; the flows $FL_4$-$FL_5$ are categorized into the flow subgroup $FsG_2$ of the flow group $FG_0$ due to the fact that the flows $FL_4$-$FL_5$ have the same hash result pkt_hash={0, 2}; the flows $FL_6$ is categorized into the flow subgroup $FsG_0$ of the flow group $FG_1$ due to the fact that the flow $FL_6$ has the hash result pkt_hash={1, 0}; the flows $FL_7$-$FL_8$ are categorized into the flow subgroup $FsG_1$ of the flow group $FG_1$ due to the fact that the flows $FL_7$-$FL_8$ have the same hash result pkt_hash={1, 1}; and the flows $FL_9$-$FL_{11}$ are categorized into the flow subgroup $FsG_2$ of the flow group $FG_1$ due to the fact that the flows $FL_9$-$FL_{11}$ have the same hash result pkt_hash={1, 2}.

As mentioned above, the flow subgroup index FsGI may be obtained from the rest of the hash result pkt_hash that is not used to serve as the flow group index FGI. However, this is not meant to be a limitation of the present invention. In an alternative design, the flow subgroup index FsGI may be generated based on another predetermined hash algorithm.

Using a flow group index FGI to act as an identifier of a flow group and using a combination of a flow group index FGI and a flow subgroup index FsGI to act as an identifier of a flow subgroup in a flow group can reduce the memory requirement, thus reducing the production cost of the proposed packet forwarding apparatus 100. However, this is for illustrative purposes only. Any means capable of categorizing flows associated with the same egress path group into a plurality of flow subgroups and categorizing the flow subgroups into a plurality of flow groups may be employed. For example, full tuples of each packet may be directly used to indicate a flow subgroup of a flow group into which the packet should be categorized.

The path selection signal ecmp_idx is set by either the flow group based path selection circuit 112 or the flow subgroup based path selection circuit 114. The path selection signal ecmp_idx controls the selection of a destination path used for forwarding the packet. When the proposed dynamic load balancing function is applied to forwarding of the packet, the path selection signal ecmp_idx further informs the path rate monitor 106 of the selected egress path. Hence, the path rate monitor 106 updates a path rate monitor value of the selected egress path based on traffic of the packet. Specifically, the path rate monitor 106 is configured to monitor data rates of egress paths of the same egress path group to generate path rate monitor values, respectively. In other words, when there are different egress path groups, the path rate monitor 106 generates path rate monitor values for egress paths of these egress path groups.

Figure 3:
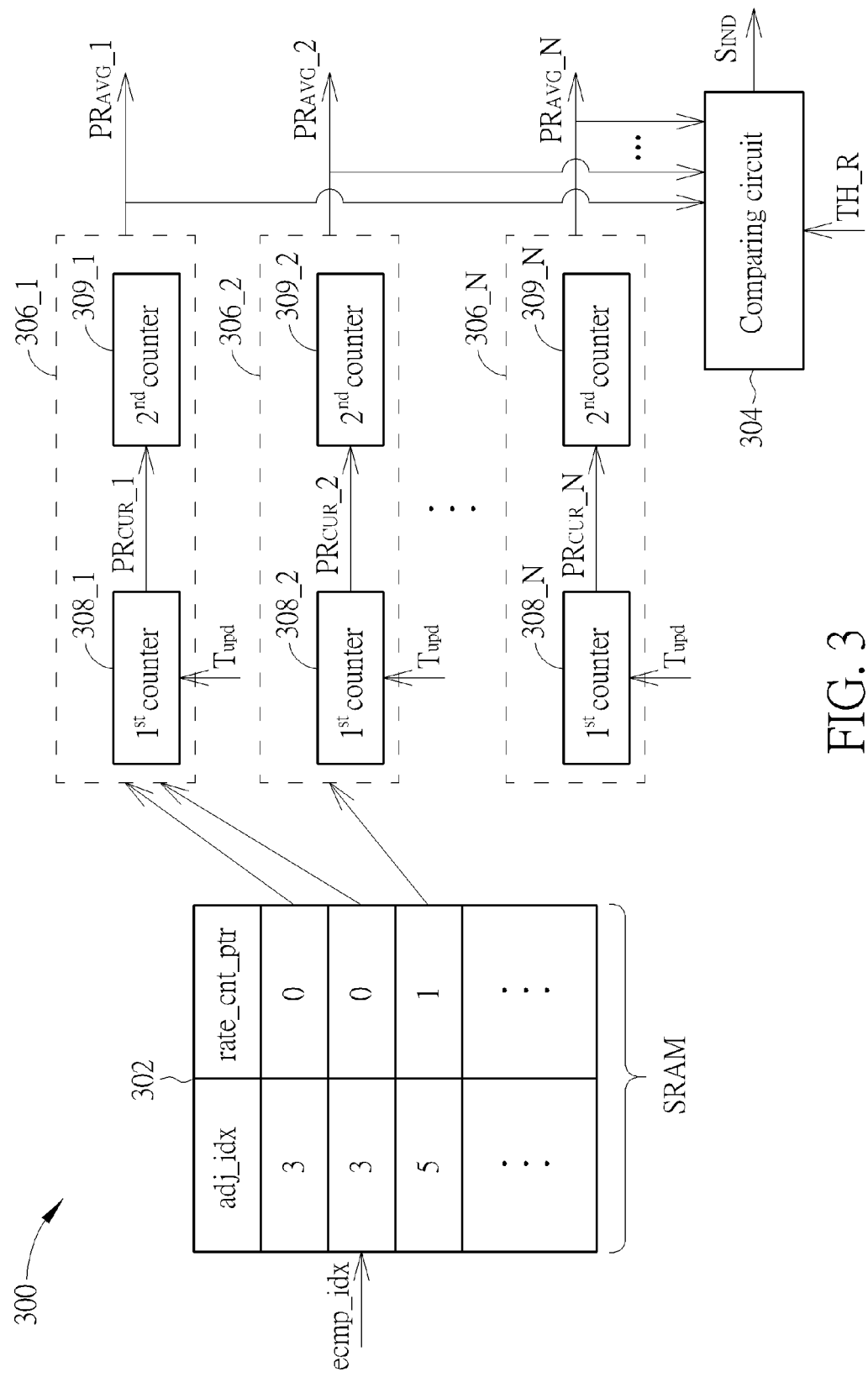
FIG. 3 is a diagram illustrating a path rate monitor according to an embodiment of the present invention.

FIG. 3 is a diagram illustrating a path rate monitor according to an embodiment of the present invention. The path rate monitor 106 shown in FIG. 1 may be implemented using the path rate monitor 300 shown in FIG. 3. The path rate monitor 300 includes a lookup table 302, a comparing circuit 304 corresponding to an egress path group, and a plurality of monitoring circuits 306_1, 306_2 . . . 306_N corresponding to different egress paths of the egress path group, respectively. The path rate monitor 300 has one monitoring circuit per path, and has one comparing circuit per egress path group. In other words, when there are N egress paths in one egress path group (e.g., an ECMP path group or an LAG), the path rate monitor 300 is configured to have N monitoring circuits and a single comparing circuit for the same egress path group. For clarity and simplicity, FIG. 3 only shows monitoring circuits and one comparing circuit for one egress path group. It should be noted that the lookup table 302 can be shared among different egress path groups. Hence, only one lookup table 302 is created in the path rate monitor 106.

The lookup table 302 has a plurality of table entries, each storing an adjacency index adj_idx and an associated rate counter pointer rate_cnt_ptr. The lookup table 302 may be stored in a static random access memory (SRAM). Hence, any of the table entries can be accessed based on a corresponding memory address pointed to by the path selection signal ecmp_idx. In other words, an entry index of each table entry in the lookup table 302 is a memory address. When a table entry in lookup table 302 is accessed based on the path selection signal ecmp_idx, the adjacency index adj_idx is read to select a destination path from egress paths of the same egress path group, and the associated rate counter pointer rate_cnt_ptr is read to select one monitoring circuit assigned to the selected destination path. In this embodiment, the rate counter pointers rate_cnt_ptr may be configured by the controller (e.g., a processor running firmware FW) 102, where more than one rate counter pointer rate_cnt_ptr may be configured to point to the same monitoring circuit. Consider a case where a received packet is required to be forwarded through one of egress paths of a specific egress path group, the path selection index ecmp_idx is generated to access one of table entries associated with the specific egress path group. For example, when the first entry shown in FIG. 3 is accessed by the path selection index ecmp_idx, a monitoring circuit 306_1 associated with one egress path of the specific egress path group is selected; when the second entry shown in FIG. 3 is accessed by the path selection index ecmp_idx, the same monitoring circuit 306_1 associated with one egress path of the specific egress path group is selected; and when the third entry is accessed by the path selection index ecmp_idx, a different monitoring circuit 306_2 associated with another egress path of the specific egress path group is selected.

The monitoring circuit assigned to the selected destination path is operative to update its path rate monitor value. In this example, the monitoring circuits 306_1-306_N generate average path rate values $PR_{AVG}\_1$-$PR_{AVG}\_N$ as path rate monitor values. As shown in FIG. 3, each of the monitoring circuits 306_1-306_N has a set of rate counters, including a first counter and a second counter. For example, the monitoring circuit 306_1 includes a first counter 308_1 and a second counter 309_1, the monitoring circuit 306_2 includes a first counter 308_2 and a second counter 309_2, and the monitoring circuit 306_N includes a first counter 308_N and a second counter 309_N.

The first counters 308_1-308_N are configured to generate instantaneous path rate values $PR_{CUR}\_1$-$PR_{CUR}\_N$, respectively. For example, each of the first counters 308_1-308_N is configured to count the number of bytes transmitted through a corresponding egress path during one predetermined period $T_{upd}$ to generate one instantaneous path rate value when the corresponding egress path is the selected destination path. The second counters 309_1-309_N are configured to generate average path rate values $PR_{AVG}\_1$-$PR_{AVG}\_N$, respectively. For example, each of the second counters 309_1-309_N is configured to generate a weighted average of an average path rate value and the instantaneous path rate value to update the average path rate value which acts as a path rate monitor value of the monitoring circuit. The operation of the second counter may be expressed using following equation.

$$PR_{AVG} = PR_{AVG} * C + PR_{CUR} * (1-C) \qquad (1)$$

In above equation (1), $PR_{AVG}$ represents an average path rate value, $PR_{CUR}$ represents an instantaneous path rate value, and C represents a weighting factor. The weighting factor C and the predetermined period $T_{upd}$ may be configured by the controller (e.g., a processor running firmware FW) 102.

The path rate monitor values (e.g., average path rate values $PR_{AVG}\_1$-$PR_{AVG}\_N$) generated from the monitoring circuits 306_1-306_N indicate traffic statuses of paths belonging to the same egress path group. In this embodiment, the comparing circuit 304 is configured to compare each of the path rate monitor values (e.g., average path rate values $PR_{AVG}\_1$-$PR_{AVG}\_N$) generated from the monitoring circuits 306_1-306_N with a predetermined threshold value TH_R, and generate an indication signal $S_{IND}$ when any of the path rate monitor values exceeds the predetermined threshold value TH_R. The predetermined threshold value TH_R may be configured by the controller (e.g., a processor running firmware FW) 102.

The operation of each of the second counters 309_1-309_N may be regarded as low-pass filtering. Hence, setting the path rate monitor value by the average path rate value can prevent the path rate monitor value from having a significant variation caused by a sudden packet traffic change. However, this is for illustrative purposes only, and is not meant to be a limitation of the present invention. Any means capable of generating path rate monitor values indicative of traffic statuses of paths belonging to the same egress path group may be employed by the path rate monitor 106. These alternative designs fall within the scope of the present invention.

When one path rate monitor value exceeds the predetermined threshold value TH_R, it implies that the packet traffic on the monitored path is too high and thus results in load unbalance of different paths in the same egress path group. Hence, when the indication signal $S_{IND}$ is asserted to indicate load unbalance, the dynamical load balancing function offered by the flow subgroup based path selection circuit 114 should be properly adjusted to reduce packet traffic on the heavy-loaded path and/or increase packet traffic on light-loaded paths. In this way, the load unbalance can be removed or mitigated to achieve a more uniform bandwidth distribution. Further details of the dynamical load balancing function performed by the flow subgroup based path selection circuit 114 will be described later.

The heavy flow monitor 108 provides additional information needed for adjusting the dynamical load balancing function offered by the flow subgroup based path selection circuit 114. In this embodiment, the heavy flow monitor 108 is configured to capture at least one heavy flow subgroup from flow subgroups of flow groups associated with the same egress path group, wherein traffic of the at least one heavy flow subgroup is higher than traffic of other flow subgroups of the flow groups. Specifically, concerning each egress path group, the heavy flow monitor 108 monitors flows forwarded through egress paths of the egress path group to capture at least one heavy flow subgroup. Hence, the heavy flow monitor 108 captures heavy flow subgroup(s) for one egress path group, and captures heavy flow subgroup (s) for another egress path group.

Figure 4:
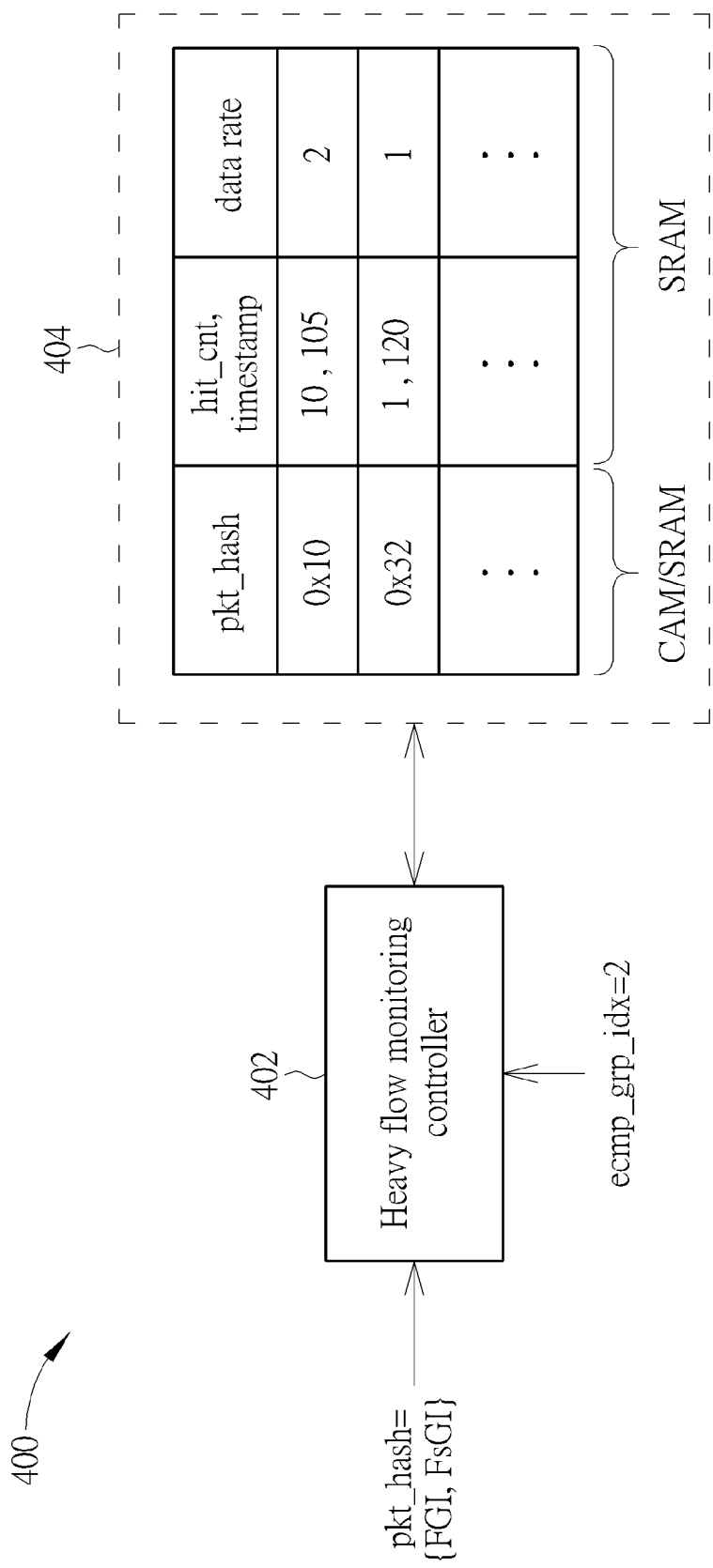
FIG. 4 is a diagram illustrating a heavy flow monitor according to an embodiment of the present invention.

FIG. 4 is a diagram illustrating a heavy flow monitor according to an embodiment of the present invention. The heavy flow monitor 108 shown in FIG. 1 may be implemented using the heavy flow monitor 400 shown in FIG. 4. In this embodiment, the heavy flow monitor 400 employs a hardware-based implementation, and includes a heavy flow monitoring controller 402 and a storage device 404 for one egress path group. For clarity and simplicity, FIG. 4 shows one heavy flow monitoring controller and one storage device only. When there are different egress path groups, the heavy flow monitor 400 has multiple sets of a heavy flow monitoring controller and a storage device, where each set of a heavy flow monitoring controller and a storage device is used to capture at least one heavy flow subgroup according to flows forwarded through egress paths of a corresponding egress path group.

A key function of network performance monitoring is determining how bandwidth is used by flows; in particular, determining which flows use the most bandwidth. In general, flows may be categorized into elephant flows each consuming a large amount of bandwidth due to high packet traffic (i.e., a large amount of data) and mice flows each consuming a small amount of bandwidth due to low packet traffic (i.e., a small amount of data). In accordance with the long-tailed nature of network traffic, there are few elephant flows compared to mice flows. That is, most of the flows carry very little traffic. Compared to mice flows, elephant flows have a large impact on load balance of paths. Based on such observation, heavy flow subgroups are identified for setting the proposed dynamic load balancing function performed by the flow subgroup based path selection circuit 114.

In this embodiment, the heavy flow monitor 400 may be used to track top-M heavy flow subgroups among flow subgroups of flow groups associated with the same egress path group, where M is an integer determined based on the actual design consideration. As mentioned above, each egress path group is assigned with one heavy flow monitor. As shown in FIG. 4, the heavy flow monitor 400 is only responsible for monitoring heavy flow subgroups among flow subgroups of flow groups associated with an egress path group having a path group index ecmp_grp_idx=2. However, this is for illustrative purposes only, and is not meant to be a limitation of the present invention.

The heavy flow monitoring controller 402 may employ a heavy flow monitoring algorithm to identify one or more heavy flow subgroups for the egress path group with the path group index ecmp_grp_idx=2. By way of example, but not limitation, a conventional flow-based heavy flow monitoring algorithm may be modified to be the heavy flow monitoring algorithm used by the heavy flow monitoring controller 402 to identify heavy flow subgroups. Further, an identifier of one captured heavy flow subgroup (e.g., a hash result pkt_hash of one captured heavy flow subgroup) may be stored in a content-addressable memory (CAM) or an SRAM, and the associated information, including a hit count hit_cnt, a timestamp and a data rate, may be stored in an SRAM. In this embodiment, the heavy flow monitor 400 is hardware based, and a rate table may be established for recording data rate information of each flow subgroup. However, this is for illustrative purposes only, and is not meant to be a limitation of the present invention. In another embodiment, the hardware-based heavy flow monitor 400 may employ flow sorting hardware that collaborates with the heavy flow monitoring algorithm. The same objective of identifying heavy flow subgroups can be achieved.

Alternatively, the heavy flow monitor 108 may be realized using a software-based implementation. For example, the heavy flow monitor 108 is a software module (e.g., an sFlow module defined by OpenFlow) executed by a processor. The same objective of capturing at least one heavy flow subgroup from flow subgroups of flow groups associated with an egress path group is achieved.

As mentioned above, the flow subgroup based path selection circuit 114 is designed for dynamic load balancing. In one exemplary design, the flow subgroup based path selection circuit 114 may use a flow rebalance table created and updated for re-directing heavy flow subgroups to light-loaded paths, thus leading to a more uniform bandwidth distribution over different egress paths in the same egress path group (e.g., an ECMP path group or an LAG).

Figure 5:
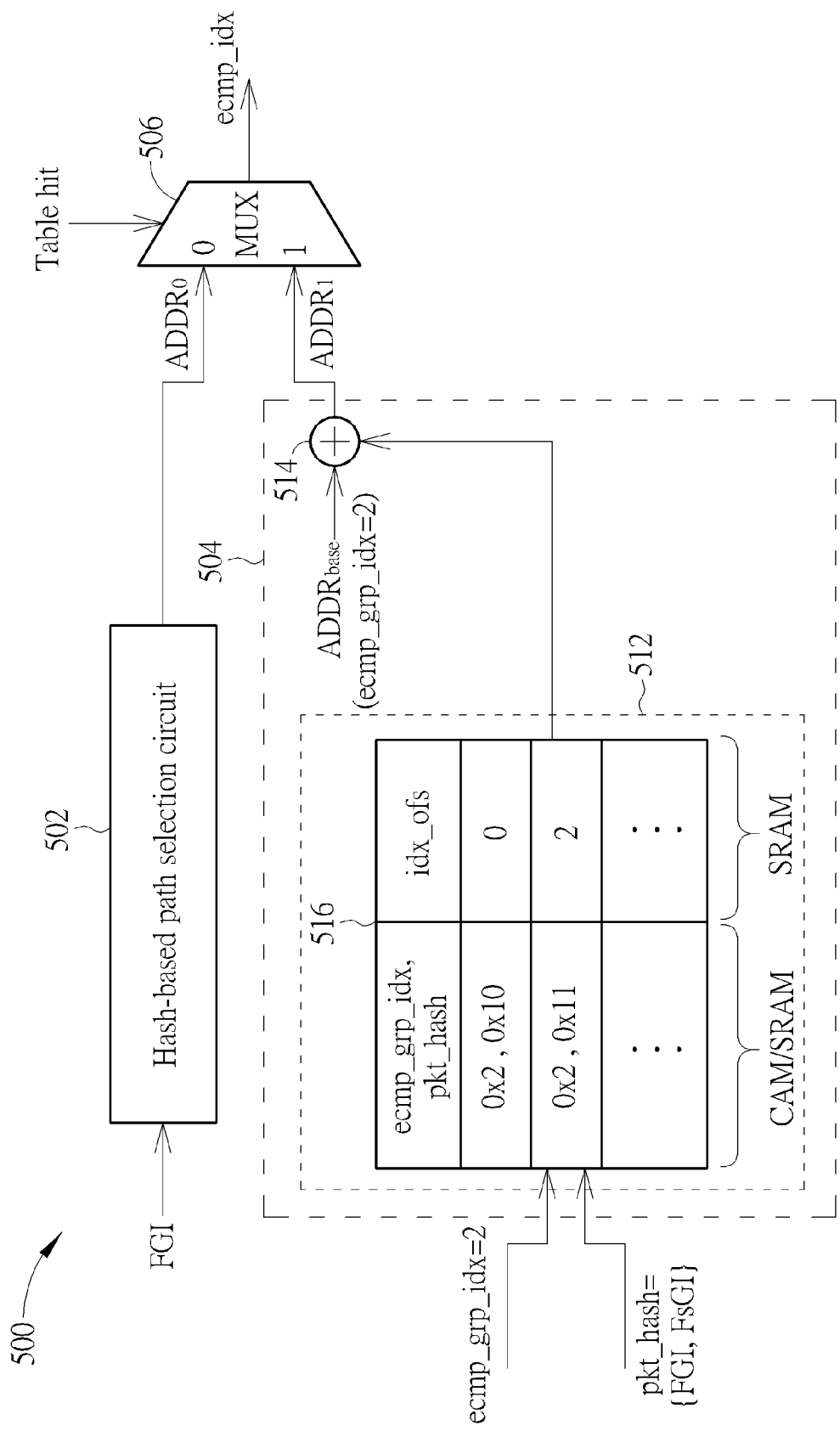
FIG. 5 is a diagram illustrating a path selection device according to an embodiment of the present invention.

FIG. 5 is a diagram illustrating a path selection device according to an embodiment of the present invention. The path selection device 104 shown in FIG. 1 may be implemented using the path selection device 500 shown in FIG. 5. The path selection device 500 includes a hash-based path selection circuit 502, a dynamic load balancing circuit 504, and a multiplexer (MUX) 506. Specifically, the hash-based path selection circuit 502 is used to realize the flow group based path selection circuit 112 shown in FIG. 1, and the dynamic load balancing circuit 504 is used to realize the flow subgroup based path selection circuit 114 shown in FIG. 1.

When there is a packet to be forwarded, an egress path group table (not shown) is checked to determine which egress path group should be used. For example, the egress path group with the egress path group index ecmp_grp_idx=2 is selected, where the selected egress path group includes N egress paths monitored by the monitoring circuits 306_1-306_N shown in FIG. 3, and flow subgroups forwarded through egress paths of the selected egress path group are monitored by the heavy flow monitoring controller 402 shown in FIG. 4. In addition, the hash result pkt_hash is generated for the packet to be forwarded. For example, the hash result pkt_hash may be divided into a flow group index FGI and a flow subgroup index FsGI. It should be noted that the hash result pkt_hash, including the flow group index FGI and the flow subgroup index FsGI, is used to identify a flow subgroup into which the packet to be forwarded is categorized, and the flow group index FGI is to identify a flow group into which the packet to be forwarded is categorized.

As mentioned above, an entry index of each table entry in the lookup table 302 shown in FIG. 3 is a memory address. Hence, the path selection signal ecmp_idx is set by a memory address where one table entry of the lookup table 302 (which includes the next-hop information) is stored. The hash-based path selection circuit 502 may employ any well-known hash-based path selection algorithm to generate a first path selection signal $ADDR_0$ based on the flow group index FGI. For example, a hash-threshold algorithm may be employed by the hash-based path selection circuit 502.

Concerning the dynamic load balancing circuit 504, it includes a storage device 512 and an adder 514. The storage device 512 is used to store a flow rebalance table 516. In one exemplary design, the flow rebalance table 516 may be shared among different egress path groups. Hence, as shown in FIG. 5, an entry index of each table entry of the flow rebalance table 516 is a combination of an egress path group index ecmp_grp_idx and a hash result pkt_hash. When a table entry is hit, an address offset idx_ofs is output from the flow rebalance table 516 to the adder 514. In this embodiment, the entry indices may be stored in a CAM or an SRAM, and the address offsets may be stored in an SRAM, thus the flow rebalance table 516 can be implemented with SRAM-based search table. Next, the adder 514 adds the address offset idx_ofs to a base address $ADDR_{base}$ to generate a second path selection signal $ADDR_1$. That is, $ADDR_1=ADDR_{base}+idx\_ofs$.

The lookup table 302 shown in FIG. 3 may also be shared among different egress path groups. Preferably, the table entries associated with the same egress path group may be stored in an allocated memory space with continuous memory addresses. Hence, one of the table entries associated with the same egress path group may be indexed by a memory address acting as a base address, and the rest of the table entries may be indexed by memory addresses, each being the base address plus one address offset. To reduce the table size, the flow rebalance table 516 may store address offsets only, as shown in FIG. 5. However, this is not meant to be a limitation of the present invention. Alternatively, the adder 514 may be omitted, and the flow rebalance table 516 may be modified to store entry indices of table entries in the lookup table 302. Hence, when a table entry of the load rebalance table 516 is hit, a stored memory address (i.e., an entry index of a table entry in the lookup table 302) is output from the flow rebalance table 516 to be the second path selection signal $ADDR_1$.

The multiplexer 506 is configured to select one of the first path selection signal $ADDR_0$ and the second path selection signal $ADDR_1$ as its output. Specifically, when one table entry of the flow rebalance table 516 is hit, implying that the dynamic load balancing function should be applied to forwarding of the packet, the multiplexer 506 outputs the second path selection signal $ADDR_1$ as the path selection signal ecmp_idx; and when no table entry of the flow rebalance table 516 is hit, implying that there is no need to apply the dynamic load balancing function to forwarding of the packet, the multiplexer 506 outputs the first path selection signal $ADDR_0$ as the path selection signal ecmp_idx.

Consider a case where the dynamic load balancing function is enabled for the egress path group with the egress path group index ecmp_grp_idx=2. Initially, the flow rebalance table 516 includes no table entries for load balancing of the egress path group. Since no table entry of the flow rebalance table 516 is hit, the path selection signal ecmp_idx corresponding to a packet categorized into a flow group associated with the packet egress path group with the egress path group index ecmp_grp_idx=2 is set by the hash-based path selection circuit 502. When the dynamic load balancing function is enabled for the egress path group, the path rate monitor 300 and the heavy flow monitor 500 are operative to perform intended functions as mentioned above. Initially, all of instantaneous path rate values $PR_{CUR}\_1$-$PR_{CUR}\_N$ and average path rate values $PR_{AVG}\_1$-$PR_{AVG}\_N$ for egress paths of the egress path group with the egress path group index ecmp_grp_idx=2 are set by initial values (e.g., 0). In addition, no heavy flow subgroup forwarded through egress paths of the egress path group with the egress path group index ecmp_grp_idx=2 is captured by the heavy flow monitor 500, initially. When one or more of paths in the egress path group are selected for packet forwarding, the path rate monitor 300 will update one or more of the path rate monitor values (i.e., average path rate values $PR_{AVG}\_1$-$PR_{AVG}\_N$), and the heavy flow monitor 500 will capture one or more new heavy flow subgroups and/or update one or more existing captured heavy flow subgroups.

When the comparing circuit 304 detects that one of the path rate monitor values (i.e., average path rate values $PR_{AVG}\_1$-$PR_{AVG}\_N$) exceeds the predetermined threshold TH_R, the comparing circuit 304 generates the indication signal $S_{IND}$ to notify the controller 102. For example, when the controller 102 is a processor running the firmware FW, the indication signal $S_{IND}$ may be an interrupt of the processor. Next, the controller 102 reads status registers to find out which {egress path group, path} triggers the interrupt. Further, the controller 102 reads the path rate monitor values (i.e., average path rate values $PR_{AVG}\_1$-$PR_{AVG}\_N$) of the egress path group from the path rate monitor 300, and reads an identifier of any captured heavy flow subgroup from the heavy flow monitor 400. The controller 102 refers to the path rate monitor values to find out at least one light-loaded path, and regards the at least one light-loaded path as at least one destination path to which one or more flow subgroups are re-directed. In addition, the controller 102 refers to the captured heavy flow subgroup(s) to find out which flow subgroup(s) should be re-directed. In other words, based on the information given from the path rate monitor 300 and the heavy flow monitor 500, the controller 102 makes a decision on how to program/update the flow rebalance table 516. After the flow rebalance table 516 is updated, packets categorized into a heavy flow subgroup can be re-directed to a light-loaded path.

As mentioned above, the flow rebalance table 516 may be updated by adding new table entries and/or replacing old table entries when the controller 102 is notified by the indication signal $S_{IND}$. Further, since the storage device 512 has a limited storage space, each table entry of the flow rebalance table 516 can be aged-out to release the occupied storage space. Besides aging, the controller 102 may employ a table management policy to update the flow rebalance table 516.

For example, the controller 102 is further configured to update the flow rebalance table 516 having an entry corresponding to a specific heavy flow subgroup of a specific flow group associated with the egress path group when the specific heavy flow subgroup of the specific flow group is evicted from the heavy flow subgroup(s). In other words, when a specific flow subgroup previously captured by the heavy flow monitoring controller 402 is replaced by another flow subgroup with a higher traffic load, the specific flow subgroup is not one of the top-M heavy flow subgroups now. Hence, the load rebalance table 516 needs to be updated by replacing or removing a table entry associated with the specific flow subgroup.

For another example, the controller 102 is further configured to update the flow rebalance table 516 having an entry corresponding to a specific egress path of the egress path group when the specific egress path is removed from the egress path group due to a path/link down event. In other words, the load rebalance table 516 needs to be managed during path removal of an egress path group.

In one exemplary design, each egress path group is further assigned with an enable bit DLB_en in the egress path group table. The enable bit DLB_en may be set by the controller (e.g., a processor running firmware FW) 102 to indicate whether the proposed dynamic load balancing function should be enabled for the corresponding egress path group. For example, when DLB_en=1 for the egress path group with the egress path group index ecmp_grp_idx=2, the dynamic load balancing function is enabled for packets categorized into flow groups associated with the egress path group with the egress path group index ecmp_grp_idx=2. When DLB_en=0 for the egress path group with the egress path group index ecmp_grp_idx=2, the dynamic load balancing function is disabled for packets categorized into flow groups associated with the egress path group with the egress path group index ecmp_grp_idx=2.

To put it simply, when a packet is received, the egress path group table is accessed to read an enable bit DLB_en and an egress path group index of an egress path group, where the enable bit DLB_en is used for determining whether to enable the dynamic load balancing function for the egress path group, and the egress path group index is used to perform table lookup for path selection/next-hop selection when the dynamic load balancing function for the egress path group is enabled.

In a case where the enable bit DLB_en indicates that the proposed dynamic load balancing function is not enabled for a selected egress path group, the flow group based path selection circuit 112 (e.g., hash-based path selection circuit 502) is used to select a destination path from the selected egress path group, the flow subgroup based path selection circuit 114 (e.g., dynamic load balancing circuit 504) is not used to select a destination path from the selected egress path group, the path rate monitor 106 (e.g., path rate monitor 300) does not need to update any path rate monitor values for the selected egress path group, and the heavy flow monitor 108 (e.g., heavy flow monitor 400) does not need to track any heavy flow subgroups forwarded through egress paths of the selected egress path group.

In another case where the enable bit DLB_en indicates that the proposed dynamic load balancing function should be enabled for a selected egress path group, one of the flow group based path selection circuit 112 (e.g., the hash-based path selection circuit 502) and the flow subgroup based path selection circuit 114 (e.g., the dynamic load balancing circuit 504) is used to select a destination path from the selected egress path group. When the flow subgroup based path selection circuit 114 (e.g., dynamic load balancing circuit 504) is not used to select a destination path from the selected egress path group for a packet due to table entry miss, the path rate monitor 106 (e.g., path rate monitor 300) does not need to update a path rate monitor value corresponding to the destination path selected by the flow group based path selection circuit 112 (e.g., hash-based path selection circuit 502) for forwarding the packet, and the heavy flow monitor 108 (e.g., heavy flow monitor 400) does not need to update a current tracking result of heavy flow subgroups corresponding to the selected egress path group. However, when the flow subgroup based path selection circuit 114 (e.g., dynamic load balancing circuit 504) is used to select a destination path from the selected egress path group for a packet due to table entry hit, the path rate monitor 106 (e.g., path rate monitor 300) needs to update a path rate monitor value corresponding to the destination path selected by the flow subgroup based path selection circuit 114 (e.g., dynamic load balancing circuit 504) for forwarding the packet, and the heavy flow monitor 108 (e.g., heavy flow monitor 400) needs to determine whether to update a current tracking result of heavy flow subgroups corresponding to the selected egress path group.

Figure 6:
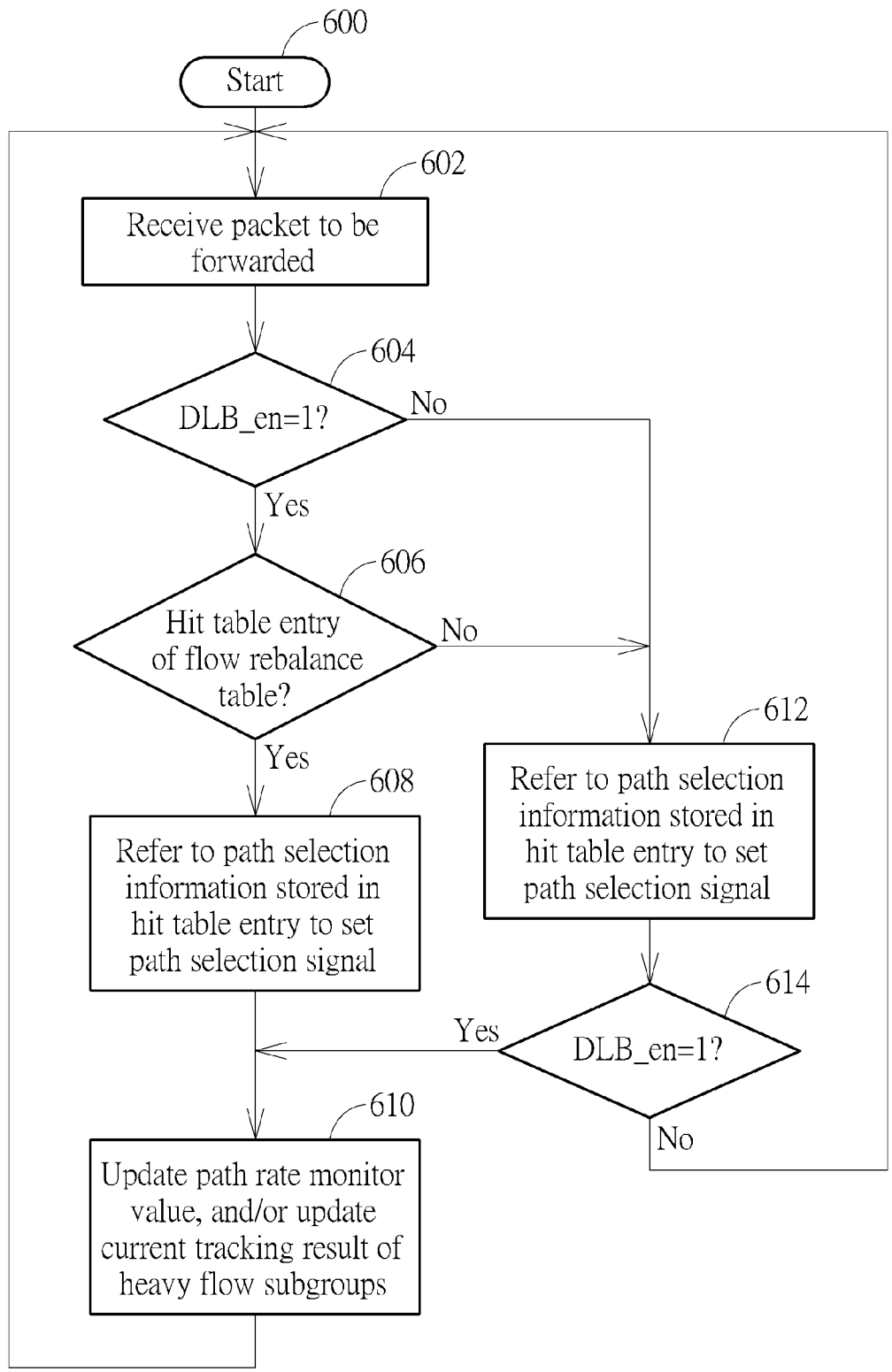
FIG. 6 is a flowchart illustrating a packet forwarding method according to an embodiment of the present invention.

FIG. 6 is a flowchart illustrating a packet forwarding method according to an embodiment of the present invention. The packet forwarding method may be employed by the packet forwarding apparatus 100 with the path selection device 104 realized using the path selection device 500, the path rate monitor 106 realized using the path rate monitor 300 and the heavy flow monitor 108 realized using the heavy flow monitor 400. Provided that the result is substantially the same, the steps are not required to be executed in the exact order shown in FIG. 6. The packet forwarding method may be briefly summarized as below.

Step 600: Start.

Step 602: Receive a packet to be forwarded.

Step 604: Check if an enable bit DLB_en corresponding to an egress path group selected for the packet to be forwarded indicates that the dynamic load balancing function should be enabled. If yes, go to step 606; otherwise, go to step 612.

Step 606: Check if a table entry of a flow rebalance table is hit. If yes, go to step 608; otherwise, go to step 612.

Step 608: Refer to path selection information stored in the hit table entry to set a path selection signal referenced for selecting a destination path from a plurality of egress paths belonging to the selected egress path group.

Step 610: Update a path rate monitor value corresponding to the selected destination path, and/or update a current tracking result of heavy flow subgroups corresponding to the selected egress path group. Go to step 602 to receive a next packet to be forwarded.

Step 612: Set the path selection signal according to flow group based path selection (e.g., hash-based path selection).

Step 614: Check if the enable bit DLB_en corresponding to the selected egress path group indicates that the dynamic load balancing function should be enabled. If yes, go to step 610; otherwise, go to step 602 to receive a next packet to be forwarded.

As a person skilled in the art can readily understand details of each step after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet forwarding apparatus, comprising:
   a path selection device, configured to generate a path selection signal referenced for selecting a destination path from a plurality of egress paths belonging to an egress path group, the path selection device comprising:
      a flow group based path selection circuit, configured to set the path selection signal based on a flow group into which a packet to be forwarded is categorized when a dynamic load balancing function is not applied to forwarding of the packet; and
      a flow subgroup based path selection circuit, configured to set the path selection signal based on a flow subgroup into which the packet to be forwarded is categorized when the dynamic load balancing function is applied to forwarding of the packet; and
   a path rate monitor, comprising:
      a plurality of monitoring circuits, configured to monitor data rates of the egress paths to generate path rate monitor values, respectively, wherein each of the monitoring circuits comprises:
         a first counter, configured to count a number of bytes transmitted through a corresponding egress path during a predetermined period, and accordingly generate an instantaneous path rate value; and
         a second counter, configured to generate a weighted average of an average path rate value and the instantaneous path rate value to update the average path rate value which acts as a path rate monitor value of the monitoring circuit;
   wherein the flow subgroup based path selection circuit operates based at least partly on the path rate monitor values;
   wherein flows associated with the egress path group are categorized into a plurality of flow subgroups, the flow subgroups are categorized into a plurality of flow groups, and each of the flows includes a group of packets with same tuple(s).

2. The packet forwarding apparatus of claim 1, wherein the flow subgroup based path selection circuit is further configured to determine whether to perform the dynamic load balancing function for the packet according to the flow subgroup of the flow group.

3. The packet forwarding apparatus of claim 1, wherein the flow subgroup based path selection circuit comprises:
   a flow rebalance table, having at least one entry configured to store a mapping between one flow subgroup of one flow group associated with one egress path group and one setting of the path selection signal; and
   the flow subgroup based path selection circuit is configured to set the path selection signal for the packet to be forwarded when the flow rebalance table contains an entry corresponding to the flow subgroup of the flow group associated with the egress path group.

4. The packet forwarding apparatus of claim 3, wherein the flow rebalance table is updated based at least partly on the path rate monitor values.

5. The packet forwarding apparatus of claim 3, further comprising:
   a controller, configured to update the flow rebalance table having an entry corresponding to a specific egress path of the egress path group when the specific egress path is removed from the egress path group.

6. The packet forwarding apparatus of claim 1, wherein the egress path group is one of an equal-cost multi-path (ECMP) group and a link aggregation group (LAG).

7. A packet forwarding apparatus, comprising:
   a path selection device, configured to generate a path selection signal referenced for selecting a destination path from a plurality of egress paths belonging to an egress path group, the path selection device comprising:
      a flow group based path selection circuit, configured to set the path selection signal based on a flow group into which a packet to be forwarded is categorized when a dynamic load balancing function is not applied to forwarding of the packet; and
      a flow subgroup based path selection circuit, configured to set the path selection signal based on a flow subgroup into which the packet to be forwarded is categorized when the dynamic load balancing function is applied to forwarding of the packet, wherein the flow subgroup based path selection circuit comprises:
         a flow rebalance table, having at least one entry configured to store a mapping between one flow subgroup of one flow group associated with one egress path group and one setting of the path selection signal, wherein the flow subgroup based path selection circuit is configured to refer to the flow rebalance table to selectively set the path selection signal;
   a path rate monitor, comprising:
      a plurality of monitoring circuits, configured to monitor data rates of the egress paths to generate path rate monitor values, respectively; and
      a comparing circuit, configured to compare each of the path rate monitor values with a predetermined threshold value, and generate an indication signal when any of the path rate monitor values exceeds the predetermined threshold value; and
   a controller, configured to update the flow rebalance table when notified by the indication signal;
   wherein flows associated with the egress path group are categorized into a plurality of flow subgroups, the flow subgroups are categorized into a plurality of flow groups, each of the flows includes a group of packets with same tuple(s).

8. A packet forwarding apparatus, comprising:
   a path selection device, configured to generate a path selection signal referenced for selecting a destination path from a plurality of egress paths belonging to an egress path group, the path selection device comprising:
      a flow group based path selection circuit, configured to set the path selection signal based on a flow group into which a packet to be forwarded is categorized when a dynamic load balancing function is not applied to forwarding of the packet; and
      a flow subgroup based path selection circuit, configured to set the path selection signal based on a flow subgroup into which the packet to be forwarded is categorized when the dynamic load balancing function is applied to forwarding of the packet, wherein the flow subgroup based path selection circuit comprises:
  a flow rebalance table, having at least one entry configured to store a mapping between one flow subgroup of one flow group associated with one egress path group and one setting of the path selection signal, wherein the flow subgroup based path selection circuit is configured to refer to the flow rebalance table to selectively set the path selection signal;
  a path rate monitor, comprising:
    a plurality of monitoring circuits, configured to monitor data rates of the egress paths to generate path rate monitor values, respectively;
  a heavy flow monitor, configured to capture at least one heavy flow subgroup from the flow subgroups of the flow groups associated with the egress path group, wherein traffic of the at least one heavy flow subgroup is higher than traffic of other flow subgroups of the flow groups; and
  a controller, configured to update the flow rebalance table according to the path rate monitor values generated by the path rate monitor and the at least one heavy flow subgroup captured by the heavy flow monitor;
wherein flows associated with the egress path group are categorized into a plurality of flow subgroups, the flow subgroups are categorized into a plurality of flow groups, each of the flows includes a group of packets with same tuple(s).

9. The packet forwarding apparatus of claim 8, wherein the controller is further configured to update the flow rebalance table having an entry corresponding to a specific heavy flow subgroup of a specific flow group when the specific heavy flow subgroup of the specific flow group is evicted from the at least one heavy flow subgroup.

10. A packet forwarding method, comprising:
  generating a path selection signal referenced for selecting a destination path from a plurality of egress paths belonging to an egress path group, wherein the generating a path selection signal comprises:
    when a dynamic load balancing function is not applied to forwarding of a packet, performing a flow group based path selection to set the path selection signal based on a flow group into which the packet to be forwarded is categorized; and
    when the dynamic load balancing function is applied to forwarding of the packet, performing a flow subgroup based path selection to set the path selection signal based on a flow subgroup into which the packet to be forwarded is categorized; and
  monitoring data rates of the egress paths to generate path rate monitor values, respectively, comprising:
    concerning each of the egress paths,
      counting a number of bytes transmitted through a corresponding egress path during a predetermined period, and accordingly generate an instantaneous path rate value; and
      generating a weighted average of an average path rate value and the instantaneous path rate value to update the average path rate value which acts as a path rate monitor value of the egress path;
  wherein the flow subgroup based path selection operates based at least partly on the path rate monitor values;
  wherein flows associated with the egress path group are categorized into a plurality of flow subgroups, the flow subgroups are categorized into a plurality of flow groups, and each of the flows includes a group of packets with same tuple(s).

11. The packet forwarding method of claim 10, wherein the flow subgroup based path selection further determines whether to perform the dynamic load balancing function for the packet according to the flow subgroup of the flow group.

12. The packet forwarding method of claim 10, further comprising:
  setting a flow rebalance table having at least one entry configured to store a mapping between one flow subgroup of one flow group associated with one egress path group and one setting of the path selection signal;
  wherein the flow subgroup based path selection sets the path selection signal for the packet to be forwarded when the flow rebalance table contains an entry corresponding to the flow subgroup of the flow group associated with the egress path group.

13. The packet forwarding method of claim 12, further comprising:
  updating the flow rebalance table based at least partly on the path rate monitor values.

14. The packet forwarding method of claim 12, further comprising:
  updating the flow rebalance table having an entry corresponding to a specific egress path of the egress path group when the specific egress path is removed from the egress path group.

15. The packet forwarding method of claim 10, wherein the egress path group is one of an equal-cost multi-path (ECMP) group and a link aggregation group (LAG).

16. A packet forwarding method, comprising:
  generating a path selection signal referenced for selecting a destination path from a plurality of egress paths belonging to an egress path group, wherein the generating a path selection signal comprises:
    when a dynamic load balancing function is not applied to forwarding of a packet, performing a flow group based path selection to set the path selection signal based on a flow group into which the packet to be forwarded is categorized; and
    when the dynamic load balancing function is applied to forwarding of the packet, performing a flow subgroup based path selection to set the path selection signal based on a flow subgroup into which the packet to be forwarded is categorized;
  setting a flow rebalance table having at least one entry configured to store a mapping between one flow subgroup of one flow group associated with one egress path group and one setting of the path selection signal, wherein the flow subgroup based path selection refers to the flow rebalance table to selectively set the path selection signal;
  monitoring data rates of the egress paths to generate path rate monitor values, respectively;
  comparing each of the path rate monitor values with a predetermined threshold value;
  generating an indication signal when any of the path rate monitor values exceeds the predetermined threshold value; and
  updating the flow rebalance table in response to the indication signal;
  wherein flows associated with the egress path group are categorized into a plurality of flow subgroups, the flow subgroups are categorized into a plurality of flow groups, and each of the flows includes a group of packets with same tuple(s).

17. A packet forwarding method, comprising:
generating a path selection signal referenced for selecting a destination path from a plurality of egress paths belonging to an egress path group, wherein the generating a path selection signal comprises:
- when a dynamic load balancing function is not applied to forwarding of a packet, performing a flow group based path selection to set the path selection signal based on a flow group into which the packet to be forwarded is categorized; and
- when the dynamic load balancing function is applied to forwarding of the packet, performing a flow subgroup based path selection to set the path selection signal based on a flow subgroup into which the packet to be forwarded is categorized;

setting a flow rebalance table having at least one entry configured to store a mapping between one flow subgroup of one flow group associated with one egress path group and one setting of the path selection signal, wherein the flow subgroup based path selection refers to the flow rebalance table to selectively set the path selection signal;

monitoring data rates of the egress paths to generate path rate monitor values, respectively;

capturing at least one heavy flow subgroup from the flow subgroups of the flow groups associated with the egress path group, wherein traffic of the at least one heavy flow subgroup is higher than traffic of other flow subgroups of the flow groups; and updating the flow rebalance table according to the path rate monitor values and the at least one heavy flow subgroup;

wherein flows associated with the egress path group are categorized into a plurality of flow subgroups, the flow subgroups are categorized into a plurality of flow groups, and each of the flows includes a group of packets with same tuple(s).

18. The packet forwarding method of claim 17, further comprising:
updating the flow rebalance table having an entry corresponding to a specific heavy flow subgroup of a specific flow group when the specific heavy flow subgroup of the specific flow group is evicted from the at least one heavy flow subgroup.

* * * * *